United States Patent [19]

Rohitkumar

[11] Patent Number: 5,049,649

[45] Date of Patent: Sep. 17, 1991

[54] COLORLESS FILMS FORMED FROM FLUORINATED POLYIMIDES

[75] Inventor: H. Vora Rohitkumar, West Warwick, R.I.

[73] Assignee: Hoechst Celanese Corp., Somerville, N.J.

[21] Appl. No.: 462,276

[22] Filed: Dec. 27, 1989

Related U.S. Application Data

[63] Continuation of Ser. No. 217,795, Jul. 12, 1988, abandoned.

[51] Int. Cl.$^5$ .................. C08G 12/00; C08G 63/00; C08G 69/26
[52] U.S. Cl. .................. 528/353; 528/176; 528/188; 528/229
[58] Field of Search ............... 528/353, 176, 188, 229

[56] References Cited

U.S. PATENT DOCUMENTS

| | | | |
|---|---|---|---|
| 3,542,735 | 11/1970 | Lynch | 528/126 |
| 3,639,343 | 2/1972 | Su | 528/126 |
| 3,649,601 | 3/1972 | Critchley et al. | 528/353 |
| 3,678,005 | 7/1972 | Rabilloud et al. | 528/128 |
| 3,812,082 | 5/1974 | Jones | 528/73 |
| 3,896,083 | 7/1975 | Gerber | 528/353 |
| 3,899,309 | 8/1975 | Hoehn et al. | 528/353 |
| 3,926,913 | 12/1975 | Jones et al. | 525/421 |
| 3,959,350 | 5/1976 | Rogers | 528/185 |
| 4,045,409 | 8/1977 | Arnold et al. | 528/128 |
| 4,061,856 | 12/1977 | Hsu | 544/193 |
| 4,063,984 | 12/1977 | Critchley | 524/408 |
| 4,079,039 | 3/1978 | Gerber | 528/179 |
| 4,080,319 | 3/1978 | Caporiccio et al. | 528/183 |
| 4,111,906 | 9/1978 | Jones et al. | 528/229 |
| 4,173,700 | 11/1979 | Green et al. | 528/353 |

(List continued on next page.)

FOREIGN PATENT DOCUMENTS 1062435 3/1967 United Kingdom ............. 528/353

Primary Examiner—John Kight, III
Assistant Examiner—P. Hampton Hightower
Attorney, Agent, or Firm—James N. Hunter

[57] ABSTRACT

A colorless, optically clear film consisting essentially of a polyimide of the formula:

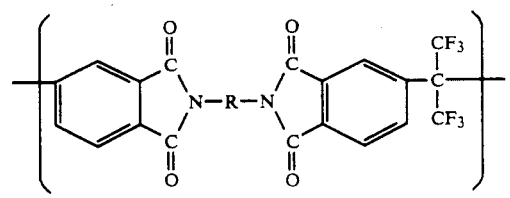

wherein R is

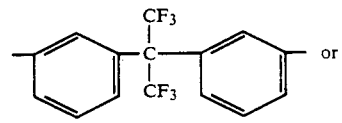 or

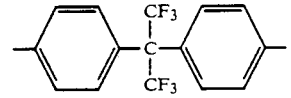

is disclosed. The composition forming the film has a weight average molecular weight, $M_w$ of at least 75,000, and has as an essential characteristic at least about 80% optical transmission at electromagnetic wavelengths of 400 nanometers and above when formed into a thickness of about two thousandths of an inch.

6 Claims, 3 Drawing Sheets

Figure 3. OPTICAL TRANSMISSION VS. WAVELENGTH

U.S. PATENT DOCUMENTS

| | | | |
|---|---|---|---|
| 4,196,277 | 4/1980 | Jones et al. | 528/353 |
| 4,206,106 | 6/1980 | Heilman et al. | 528/353 |
| 4,218,555 | 8/1980 | Antonoplos et al. | 528/353 |
| 4,220,750 | 9/1980 | Reinhardt et al. | 528/172 |
| 4,251,417 | 2/1981 | Chow et al. | 528/353 |
| 4,251,418 | 2/1981 | Chow et al. | 528/353 |
| 4,251,419 | 2/1981 | Heilman et al. | 528/353 |
| 4,251,420 | 2/1981 | Antonoplos et al. | 528/353 |
| 4,255,313 | 3/1981 | Antonoplos et al. | 528/353 |
| 4,284,461 | 8/1981 | St. Clair et al. | 528/353 |
| 4,299,750 | 11/1981 | Antonoplos et al. | 528/353 |
| 4,336,175 | 6/1982 | Gibbs | 528/353 |
| 4,454,310 | 6/1984 | Oka et al. | 528/188 |
| 4,467,000 | 8/1984 | Economy et al. | 528/229 |
| 4,535,101 | 8/1985 | Lee et al. | 521/189 |
| 4,542,257 | 9/1985 | Fraser et al. | 528/353 |
| 4,569,988 | 2/1986 | Scola et al. | 528/353 |
| 4,588,804 | 5/1986 | Fryd | 528/353 |
| 4,645,824 | 2/1987 | Landis et al. | 528/353 |
| 4,654,415 | 3/1988 | Ahne et al. | 528/353 |
| 4,656,244 | 4/1987 | Ahne et al. | 528/353 |
| 4,684,714 | 8/1987 | Lubowitz et al. | 528/353 |
| 4,716,216 | 12/1987 | Takekoshi et al. | 528/353 |
| 4,720,539 | 1/1988 | Rabilloud et al. | 528/353 |
| 4,734,464 | 3/1988 | Biensen | 528/353 |
| 4,735,492 | 4/1988 | Sekine et al. | 528/353 |
| 4,736,015 | 4/1988 | Rabilloud et al. | 528/353 |
| 4,742,152 | 5/1988 | Scola | 528/353 |

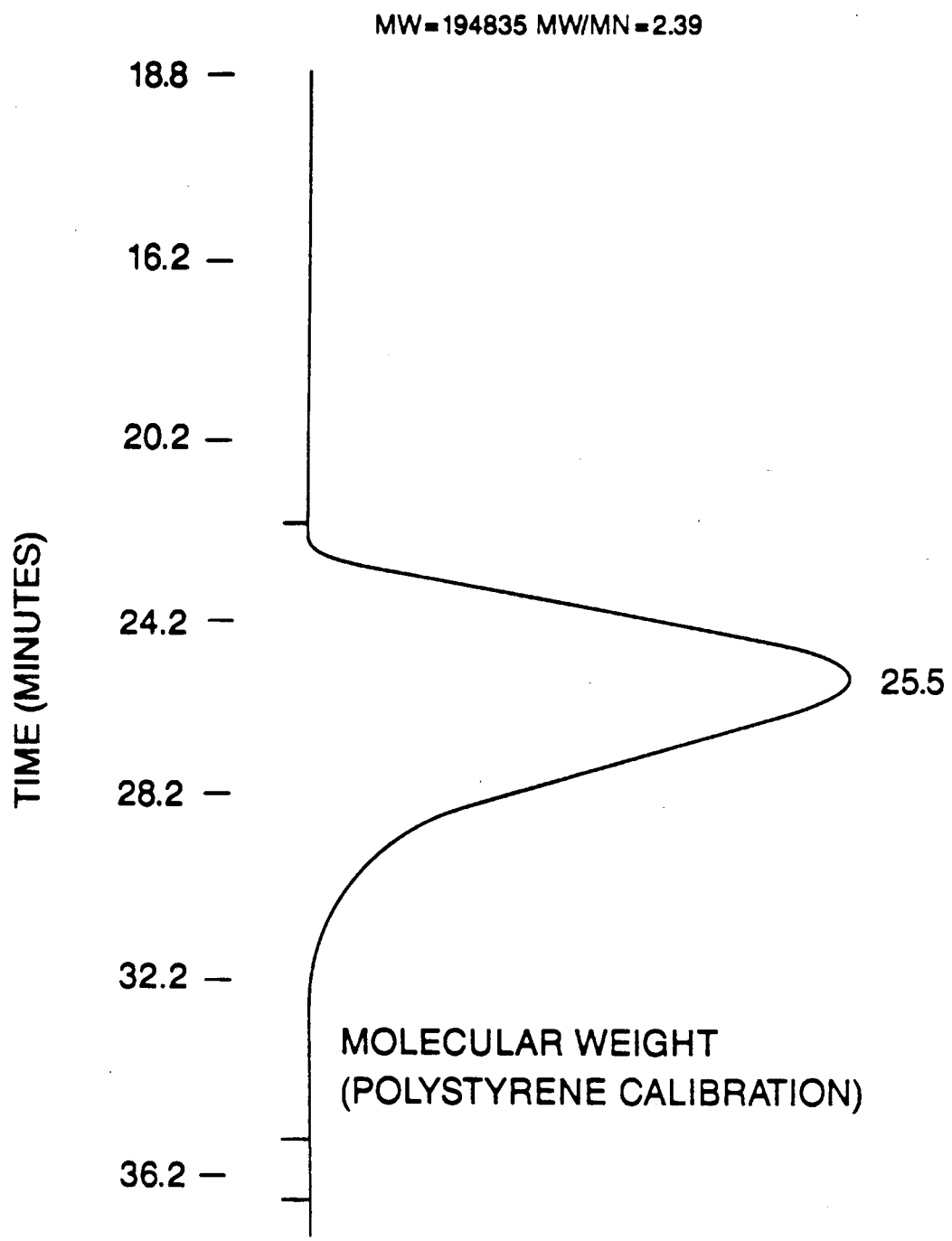
Figure 1. GEL PERMEATION CHROMATOGRAPHY CURVE FOR POLYMER OF EXAMPLE I

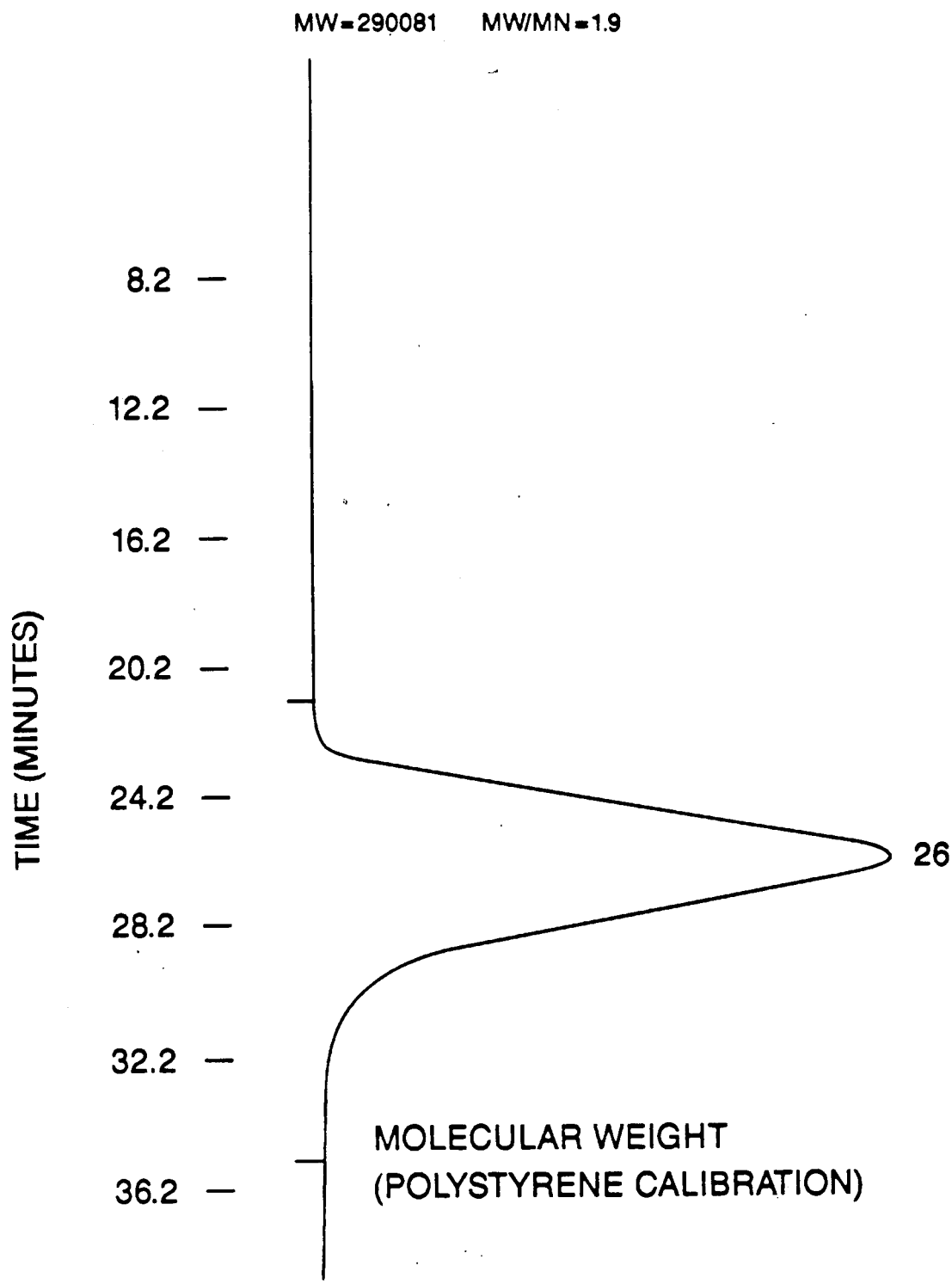
Figure 2. GEL PERMEATION CHROMATOGRAPHY CURVE FOR POLYMER OF EXAMPLE II

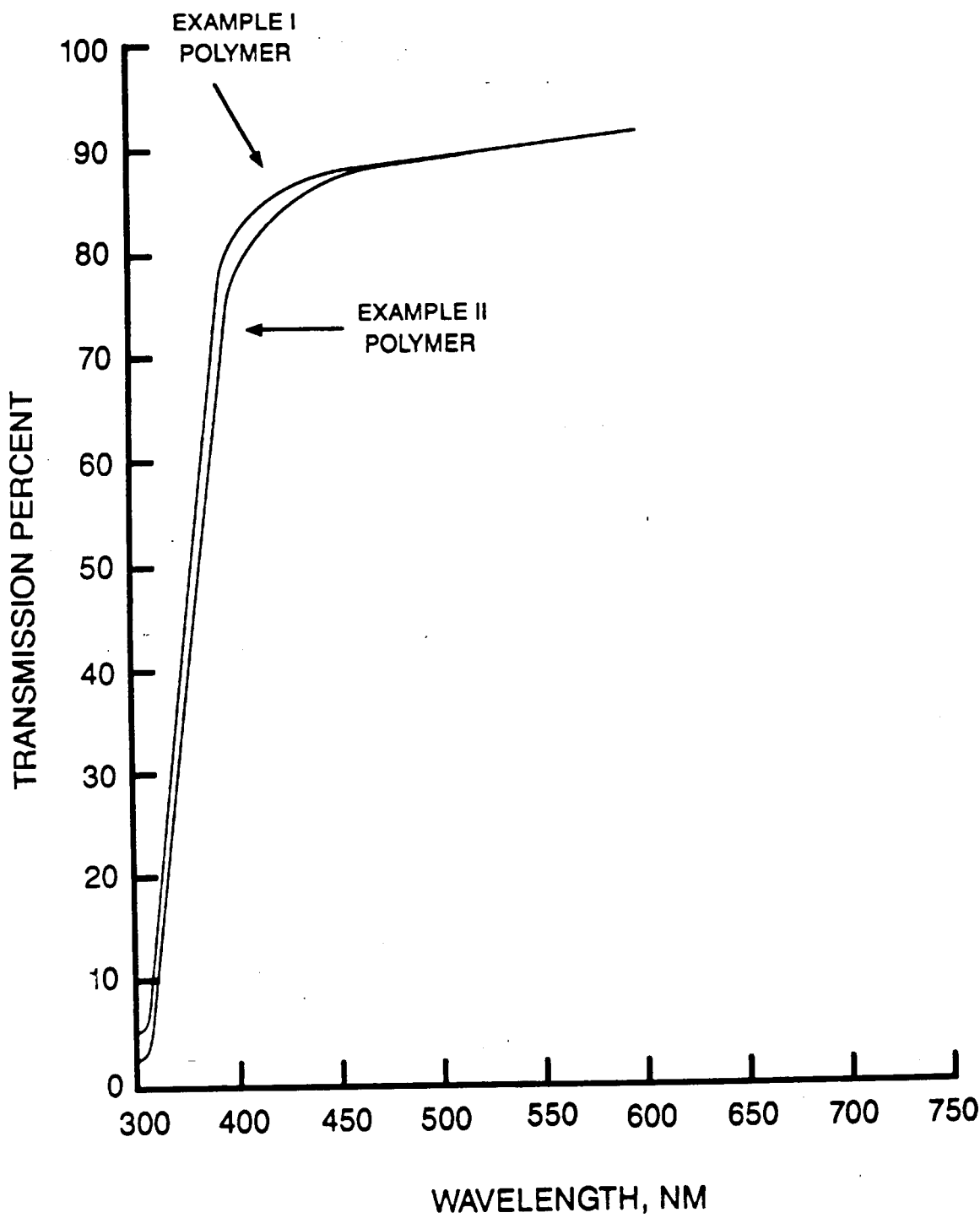
Figure 3. OPTICAL TRANSMISSION VS. WAVELENGTH

COLORLESS FILMS FORMED FROM FLUORINATED POLYIMIDES

CROSS REFERENCE TO RELATED APPLICATION

This application is a continuation of U.S. Ser. No. 217,795 filed July 12, 1988, now abandoned.

TECHNICAL FIELD

The present invention relates generally to polyimides and more specifically to polyimides containing hexafluoropropylidene linkages.

BACKGROUND ART

Polyimides in general are well known in the art to be useful for high temperature applications, since they have a glass transition temperature of about 300 degrees Celsius an above. Such polymers may be prepared in any number of ways, perhaps the most common method being a two-step process including reacting a dianhydride such as pyromellitic dianhydride (PMDA) with a diamine to form a soluble polyamic acid which is then cyclized, thermally or by chemical means to form a polyimide.

Such procedures have been employed in connection with fluorinated polyimides as shown, for example, in Rogers U.S. Pat. No. 3,356,648. Example 11 of the '648 patent discloses a method of preparing a polyimide from 2,2'-bis(3,4-dicarboxyphenyl) hexafluoropropane dianhydride and 2,2'-bis(4-aminophenyl) hexafluoropropane. Equimolar amounts of the diamine and dianhydride are stirred together in dioxane for about eighteen hours at room temperature to form a polyamic acid. To the polyamic acid is added acetic anhydride and a minor amount of beta-picoline. After stirring for about 15 minutes, without cooling, the mixture is poured onto a glass plate to form a gel film. The gel film is heated in an oven at 120° C. for twelve hours, then heated two more hours at 250° C. to form a polyimide film. The polyimide film thus produced is reportedly soluble in chloroform, benzene, dioxane and acetone.

Other fluorinated polyimides are disclosed in Rogers U.S. Pat. No. 3,959,350. In Example I of the '350 patent, a fluorinated polyimide is prepared by mixing equimolar amounts of the 2,2'-bis(3,4-dicarboxyphenyl) hexafluoropropane dianhydride and 4,4'-diaminodiphenyl ether in dimethylacetamide under a nitrogen atmosphere at room temperature. The intermediate polyamic acid is converted to the corresponding polyimide by adding beta-picoline and acetic anhydride.

Fluorinated polyimides prepared as above do not have the desired properties in terms of molecular weight, color and other parameters required for many applications and thus further work has been done in this field. For instance, in Landis et al. U.S. Pat. No. 4,645,824, there is disclosed and claimed a method of preparing high molecular weight fluorinated polyimides prepared by way of cresol solution In the '824 patent, a method of preparing polyimides is described including the steps of step equimolar amounts of 4,4'-hexafluoroisopropylidene bis(phthalic dianhydride) and 2,2'-bis(3-aminophenyl) hexafluoropropane in cresol at room temperature. The mixture is heated to about 215° Celsius for one hour to yield polyimide of molecular weight up to about 35,000, reportedly soluble in dimethylacetamide.

The above noted polymers, while exhibiting the temperature performance characteristic of polyimides, do not exhibit the properties desired in many end-uses.

It is accordingly an object of the invention to produce fluorinated polyimide compositions exhibiting superior performance in terms of mechanical properties, thermal stability, low dielectrics, optical properties, and other, more uniform characteristics.

Another object of the invention is to achieve shaped articles of suitable mechanical and optical properties for end uses in demanding environments.

Still further objects and advantages of the present invention will become readily apparent from the following description and claims.

SUMMARY OF INVENTION

The present invention is directed to certain ultra-high molecular weight fluorinated polyimide compositions, a method of producing same and shaped articles of such fluorinated polyimide compositions exhibiting the properties and advantages herein stated. There is provided in accordance with the invention high molecular weight polyimide compositions of the formula:

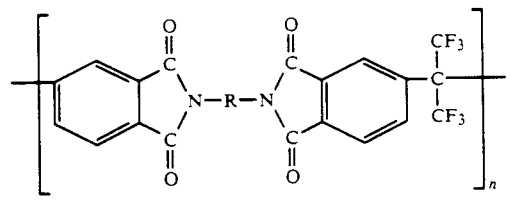

wherein R is

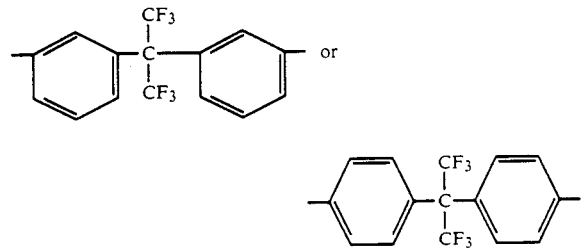

The compositions of the present invention are produced by way of a substantially isothermal, low temperature process such that the weight average molecular weight, $M_w$ is at least about 75,000 and the polymer exhibits low polydisperity values, from about 1.8 to about 2.6. shaped articles formed of the novel composition of the present invention such as thin films are colorless and exhibit unique properties, such as low dielectric constant, optical clarity and flexibility.

BRIEF DESCRIPTION OF DRAWINGS

The present invention is described in connection with several figures, in which:

FIG. 1 is a gel permeation chromatography curve of the molecular weight distribution of the polymer disclosed in Example I hereof;

FIG. 2 is a gel permeation chromatography curve of the molecular weight distribution of the polymer disclosed in Example II hereof; and FIG. 3 is a graph of Optical Transmission versus wavelength for films of 0.0018 inches in thickness formed of the polymers of Examples I and II.

DETAILED DESCRIPTION

The invention is discussed in detail below in connection with several examples. For purposes of brevity only, and not by way of limitation, terminology, measurements and procedures are now enumerated. Unless otherwise indicated, terms are used throughout as detailed below.

INHERENT VISCOSITY

The inherent viscosity of polymer samples was obtained by measuring the viscosity of the polymer solution and the solvent and the inherent viscosity (IV) was calculated from the following equation:

$$\text{Inherent Viscosity} = \frac{\text{Natural Logarithm}\left(\frac{\text{Viscosity of Polymer Solution}}{\text{Viscosity of Solvent}}\right)}{C}$$

where C is the concentration expressed in grams of polymer per milliliters of solution. In all cases, inherent viscosity was measured using 0 5 grams of polymer or reaction mixture in 100 ml of dimethyl acetamide at 25 degrees Celsius

MOLECULAR WEIGHT DATA

The molecular weight of the polymers, whether weight average molecular weight, $M_w$ or number average molecular weight $M_n$ were measured by gel permeation chromatography (GPC) performed on dilute solutions of the polymer in tetrahydrofuran (THF). The actual apparatus employed consisted of a Waters (Millipore Corp.) programmable automatic sampler, vacuum pump, chromatography columns with heater, and a differential refractometer connected to a Shimadzu CR 30A data reduction system with accompanying software (version 1.1, Shimadzu part No. T/N 22301309-91). The refractometer used was a Waters model 410 and four chromatography columns, 500 Angstrom, 1000 Angstrom, 10,000 Angstrom and 100,000 Angstrom (available from Waters) were connected in series. The system was calibrated using multiple available polystyrene standards ranging in molecular weight as follows:

TABLE 1

| GPC CALIBRATION | |
|---|---|
| Calibration Standard (Polystyrene) | Mol. Wt. |
| 1 | 470,000 |
| 2 | 170,000 |
| 3 | 68,000 |
| 4 | 34,500 |
| 5 | 9,200 |
| 6 | 3,200 |
| 7 | 1,250 |

The standards are essentially monodisperse, consisting substantially of a single molecular weight. With the system thus calibrated the weight average molecular weight $M_w$, the number average molecular weight $M_n$, and polydispersity, $M_w/M_n$ were obtained for polymers produced in accordance with the examples given hereinafter.

TRACE METAL

Polymers produced in accordance with the present invention were tested for ionic impurities such as sodium, potassium and iron. Trace metal data given herein was obtained using a Perkin Elmer 2380 Atomic Absorption Spectrophotometer.

OPTICAL PROPERTIES

The various films disclosed hereinafter were tested for optical transmission in the visible light range using a Perkin Elmer 559 ultraviolet spectral photometer.

ELECTRICAL, THERMAL MECHANICAL PROPERTIES

Glass transition temperatures (Tg) were determined by differential scanning calorimetry using a Perkin Elmer DSC-4 calorimeter operating at 20° C./min, nitrogen atmosphere at 60 cc/min. Glass transition temperature by this method is generally defined as the point of intersection of tangent lines about the point of first inflection of the heating curve of the polymer. Thermogravimetric analysis was performed with a Perkin Elmer 65-2 analyzer at 20° C./min with an air rate of 80 cc/min. TGA values given herein are for five percent weight loss; in other words, the temperature at which 5% weight loss is observed is reported.

Limiting Oxygen Index (LOI) was measured in accordance with ASTM D-2863-77; which refers to excess oxygen, over air content, required to maintain a flame Dielectric Constant was measured in accordance with ASTM D-150-81.

Dissipation Factor was measured in accordance with ASTM D-150-81.

Volume Resistivity was measured in accordance with ASTM D-257-78.

Dielectric Strength was measured in accordance with ASTM D-149-81.

Surface Resistivity was measured in accordance with ASTM D-257-78.

Mechanical properties were measured in accordance with ASTM D-882-81 using an Instron model 4202 provided with a computer interface (Series IX, version 2.51 software). Cross head speed was set at 0.2 inch/minute and gauge length was two inches. Unless otherwise indicated, a one hundred pound load cell was used, sample width was 0.5 inches and tests were conducted at 75° F. with a relative humidity of fifty per cent.

REACTANTS

Monomers used in accordance with the examples which follow are preferably substantially analytically pure; for example, in both examples I and II "electronic" grade fluorinated dianhydride is specified. This material contains more that 98.5% dianhydride, less that 1.5% of the corresponding monoanhydride-diacid and less than 0.1% of the corresponding tetra-acid. The 2,2'-bis(3,4-dicarboxy phenyl) hexafluoropropane dianhydride specified herein (6FDA) is available from Hoechst-Celanese Corporation, Route 202–206 North, Somerville, N.J. 08876. Electronic grade danhydride contains less than 10 ppm sodium, less than 5 ppm iron, less than 2 ppm cobalt and less that 2 ppm manganese, and has a melting point of 246.5 degrees Celsius.

Diamine utilized in accordance with the present invention is also preferably substantially analytically pure. To obtain the preferred purity of the diamines noted hereinafter, an available grade or synthesized grade of 2,2'-bis(4-aminophenyl) hexafluoropropane or 2,2'-bis(3-aminophenyl) hexafluoropropane is dissolved in aqueous hydrochloric acid and treated with activated charcoal stirred for thirty minutes and filtered. The treatment is repeated as necessary to remove color impurities. The aqueous solution obtained after repeated filtering is treated with ammonium hydroxide until the ph of the resulting slurry is about 9. The diamine slurry is then filtered and washed with de-ionized or distilled water to form a filter cake, which in turn is redissolved in methanol and clarified through a five micron or smaller filter Subsequently, diamine is precipitated from the methanol solution by the addition of distilled or de-ionized water and washed, also with water. The moist diamine is dried overnight in a vacuum oven and contains less that 10 ppm iron, sodium and chloride ions. Further information concerning diamines may be found in copending application Ser. No. 105,857 filed Oct. 7, 1987, now U.S. Pat. No. 5,011,997 the disclosure of which is incorporated herein by reference.

EXAMPLE I

A 5000 ml 3 neck flask was fitted with a stirrer, condenser, ice water bath, thermometer and nitrogen atmosphere. To the flask, 250.5 g. (0.75 mole) of recrystallized substantially pure 2,2'-bis(4-aminophenyl) hexafluoropropane (Mw=334) along with 1000 grams freshly distilled N-methyl pyrrolidone (NMP) was charged. The mixture was agitated to get a clear solution, cooling was applied and agitation was continued until the diamine solution reached about 15 degrees Celsius. To the cooled solution, 333 grams (0.75 mole) of electronic grade 2,2'-bis(3,4-dicarboxyphenyl) hexafluoropropane dianhydride was charged portion-wise in substantially equal intervals while the system was agitated over a forty-five minute period so that the solution was maintained at 20°-25 degrees Celsius by the bath while the exothermic polymerization occurred. The beakers used to add the diamine and dianhydride was washed with an additional 1334 grams of freshly distilled NMP which was added to the reaction flask to make a roughly 20 percent solution of polymer precurser. The reaction mixture was agitated gently for twenty hours, while maintaining the temperature uniformly throughout the reaction mixture at about 25° Celsius to obtain a high IV polyamic acid, (IV 1.14 dl/gm at 0.5 grams/dl in dimethyl acetamide (DMAC) at 25° C). To 2792 grams of the viscous polyamic acid solution, 71.81 grams of reagent grade beta picoline was dispersed by agitation for several minutes and subsequently 718.10 grams of acetic anhydride were added. Preferably, the acetic anhydride is added dropwise. The reaction mixture was agitated for six hours at 25 degrees Celsius to complete cyclization. The above process was carried out in a dry nitrogen atmosphere and the reactants were in all cases added in portions so that any substantial amount of gellation is avoided. Likewise, it is important to keep temperature suitably uniform in all steps. The polyimide thus produced was precipitated in methanol, using about 2000 mls of methanol for every 500 mls of polymeric material. The precipitated polymer was washed with fresh methanol and dried overnight at 60°-65 degrees Celsius. 520 grams of solid (98% of theoretical yield) was produced.

The white solid polymer thus obtained had the following characteristics:
Inherent Viscosity: 1.02 dl/g
Mol. Wt. Data (GPC): Mw=194,800, Mn=81,200
polydispersity=2.4
Glass Transition Temp. (DSC): 328° C.
Wt. Loss (TGA, 20° C./min.): 5% @520° C.
Trace Metal (AA): Na=2.4 PPM, Fe=4 2 PPM
Color: Colorless, transparent film

EXAMPLE II

Following the procedure of Example I, the following materials were used:
267.2 grams (0.8 mole) recrystallized, substantially pure 2,2'bis(3-aminophenyl) hexafluoropropane
NMP: 1000 grams to initially dissolve diamine and 1490 grams added during the procedure.
355.2 grams (0.8 moles) electronic grade 2,2'-bis(3,4 dicarboxyphenyl) dianhydride
79.5 grams beta picoline
795 grams acetic anhydride
570 grams of white solid polymer was obtained (97 percent of theoretical yield), having the following characteristics:
Inherent Viscosity: 0 9 dl/g.
Mol. Wt Data (GPC): Mw=290,000, Mn =151,690; polydispersity=1.9
Glass Transition Temp. (DSC) 255° C.
Wt. Loss (TGA) 20° C./min): 5% @520° C.
Trace Metal (AA): Na=3.7 PPM, K=2.2 PPM, Fe=2.9 PPM
Color: Colorless, transparent film
The intermediate polyamic acid had an inherent viscosity, IV, of 1.0 dl/g.

As may be seen from the foregoing, the polyimides in accordance with the present invention exhibit very high molecular weight and low values of polydispersity. The polymers so formed are useful for making shaped articles such as fibers, films, or molded articles as further discussed herein. It will be appreciated by one of skill in the art that such articles have superior properties to lower molecular weight products, for example in terms of optical properties, electrical properties and stability of the polymer.

MOLECULAR WEIGHT CHARACTERISTICS

FIGS. 1 and 2 are representations of molecular weight distribution typical of the polymers produced in accordance with Examples I and II. As will be noted, the peaks for the polymer are substantially singular (as opposed to bimodal or trimodal etc.) characteristic of a polymer composition having a measured polydispersity of about 1.8 to 2.6. It will be further noted that the peaks are sharp, as opposed to shouldered, which shouldering would be the case if there were substantial amounts of low molecular weight material mixed with high molecular weight material.

FILM PREPARATION

Films were prepared from polymers prepared in accordance with Examples I and II by dissolving twenty five grams of solid, granular polymer in one hundred grams of 70/30 gamma-butyrolactone/diglyme mixture to achieve a colorless, clear solution of twenty percent N.V. concentration. Films were then cast on a clean glass plate by spreading the solution with a doctor's blade, followed by heating in an air circulating oven with the following heating sequence:

2 hrs. @70° C.
1.5 hrs. @100° C.
1.0 hr. @150° C.
0.5 hr. @200° C.
0.5 hr. @250° C.

1.0 hr. @350° C.

FILM PROPERTIES

A. Optical Transmission

Films of 1.8 thousandths of a inch (1.8 mils) thickness were prepared from polymers produced in accordance with Examples I and II. Optical Transmission data appears in FIG. 3 for the two polymers. As may be seen, the films transmit over seventy five per cent of the incident light at wavelengths of about 400 nanometers and above which would include all of the visible spectrum.

B. Electrical Properties

A three one-thousandths of an inch (3 mil) film was prepared as above from the polymers of Examples I and II and was found to have the following electrical properties shown in Table 2.

C. Mechanical Properties

Films of 2.2 mil and 2.5 mil thickness respectively were prepared and Instron tested for elongation at break, stress at break and Young's Modulus. Data appears below for polymers prepared in accordance with Examples I and II.

cally heated platens. Temperature was controlled using Eurotherm microprocessor-based digital temperature controller, monitoring temperature via thermocouples embedded inside both platens. Temperature in the mold was monitored by a type K thermocouple embedded in the mold thermowell and attached to an Omega digital thermometer. The mold was insulated by solid Fiberfrax insulation; temperature difference, at equilibrium, between the platens and the mold was less than 2° C.

Pressure (5000 psi) was applied to the mold at the beginning of the heat-up cycle, and was maintained at 5000 psi throughout the cycle. Temperature was increased smoothly and rapidly (approximately 1 hour) up to the set point, held for 1 hour, then cooled to ambient temperature (2 hours). The disk was then removed from the mold.

Blanks for tensile testing were made by cutting from the disk with a band saw. ASTM D638 type V microntensile bars were then machined from the blanks using a Tensilkut router. Due to the surface smoothness of the specimens, further surface polishing was deemed unnecessary. Tensile properties were determined on an Instron tensilometer with a 1000 lb load cell, 0.05"/min crossheadspeed, with an extensiometer attached to the specimen. Additional information on the specimens and

TABLE 2

| | ELECTRICAL PROPERTIES | | | | | | |
|---|---|---|---|---|---|---|---|
| | DIELECTRIC CONSTANT | | DIELECTRIC STRENGTH | DISSIPATION FACTOR | | VOLUME RESISTIVITY | SURFACE RESISTIVITY |
| POLYMER | @ 1 MHz | @ 10 MHz | VOLT/MIL | @ 1 MHz | @ 10 MHz | Ohm. Cm. | Ohm. |
| Example I | 2.78 | 2.58 | 1500 | $4 \times 10^{-4}$ | $1.8 \times 10^{-3}$ | $1.92 \times 10^{16}$ | $3.14 \times 10^{14}$ |
| Example II | 2.78 | 2.58 | 1933 | $6 \times 10^{-4}$ | $1.5 \times 10^{-3}$ | $1.97 \times 10^{16}$ | $3.14 \times 10^{14}$ |

TABLE 3

| | Mechanical Properties | | |
|---|---|---|---|
| Polymer | Elongation (%) | Stress at Break (psi) | Young's Modulus (Ksi) |
| Example II | 8 | 15,000 | 400 |
| Example I | 5 | 14,000 | 401 |

D. Oxidation and Solubility

Films of 2.2 and 2.5 thickness were also tested for limiting oxygen index (LOI). Polymers of Example I required 47.4% per cent excess oxygen over air oxygen content (LOI 47.4); while polymers of Example II has an LOI of 50.7, and less than 1% per cent smoke generation when burning. So also, films of the present invention are base stable, after annealing at 350° C. for two hours, in sodium hydroxide, and exhibit no loss in weight or change in optical characteristics after treatment at room temperature with 5.0 and 10.0 weight to weight sodium hydroxide to water solutions for one hour.

COMPRESSION MOLDABILITY

Polymers prepared in accordance with the present invention may be compression molded at surprisingly low temperatures, well below their glass transition temperatures. Polymer of Examples I and II were prepared in granular form, having an average particle size of 500 microns. Molding trials were conducted using a standard 2¼" diameter tool-steel mold, equipped with a thermocouple cavity and coated with Freekote #44 mold release agent. The press used was a Dake 30-ton laboratory press, equipped with top and bottom electrimolding appears below. The molded polymer of Examples I and II machined easily in a manner similar to plexiglas.

TABLE 4

| | Molding Data | |
|---|---|---|
| POLYMER | EXAMPLE II | EXAMPLE I |
| Glass Transition Temp. Tg °C. | 255° C. | 322° C. |
| Molding Temp. ° C. | 220° C. | 250° C. |
| Molding Pressure psi | 5000 psi | 5000 psi |
| Specimen | Transparent light amber color disk | Transparent light yellow color disk |
| Dimension | 2¼" diameter, ¼" thick | 2¼" diameter, ¼" thick |
| Density | 1.49 gms/cc | 1.47 gms/cc |
| Tensile Strength | 11.4 Kpsi (79 MPa) | 12.8 Kpsi (88 MPa) |
| Strain % | 2.1% | 3.0% |
| Modulus | 0.55 Mpsi (3800 Mpa) | 0.47 MPsi (3200 MPa) |

The invention has been described in detail hereinabove with respect to several embodiments and accordingly, further explanation, data and examples is deemed unnecessary. Various modifications will be obvious to those of ordinary skill in the art; which modifications are within the spirit and scope of the present invention which is limited only by the appended claims.

I claim:

1. A colorless, optically clear film consisting essentially of a polyimide of the formula:

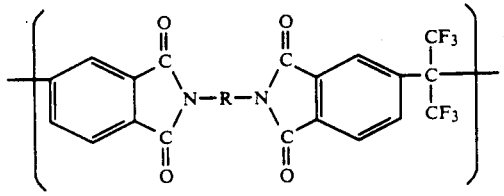

wherein R is

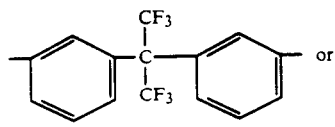 or

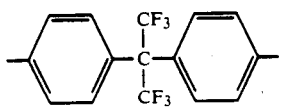

and wherein said composition has a weight average molecular weight, $M_w$ of at least 100,000, and wherein said film has as an essential characteristic at least 80% optical transmission at electromagnetic wavelengths of 400 nanometers and above when formed into a thickness of two thousandths of an inch; said film being free-standing and flexible, and also being formed from a fully imidized precursor which was synthesized in accordance with the process of:

(a) dispersing a diamine and a dianhydride in a first solvent and polymerizing the reactants at a temperature of below about 35 degrees Celsius to form a polyamic acid;

(b) chemically cyclizing said polyamic acid to form a polyimide of said reactants while maintaining the temperature below about 35 degrees Celsius; and (c) precipitating said polyimide reaction product by dissolving said first solvent in a second solvent in which said polyimide is not solvable.

2. The composition according to claim 1, wherein the weight average molecular weight, $M_w$, of said composition is at least about 150,000.

3. The composition according to claim 2, wherein the weight average molecular weight, $M_w$, of said composition is at least about 200,000.

4. The composition according to claim 3, wherein the weight average molecular weight, $M_w$, is at least about 250,000.

5. The composition according to claim 1, wherein the polydispersity of said polyimide forming said film is from about 1.8 to about 2.6.

6. The composition according to claim 5, wherein the polydispersity of said polyimide forming the film is from about 1.9 to about 2.4.

* * * * *